Dec. 5, 1939.  D. E. GRAY  2,182,376
ELECTROLYTIC CONDENSER AND METHOD OF MAKING THE SAME
Filed July 6, 1934
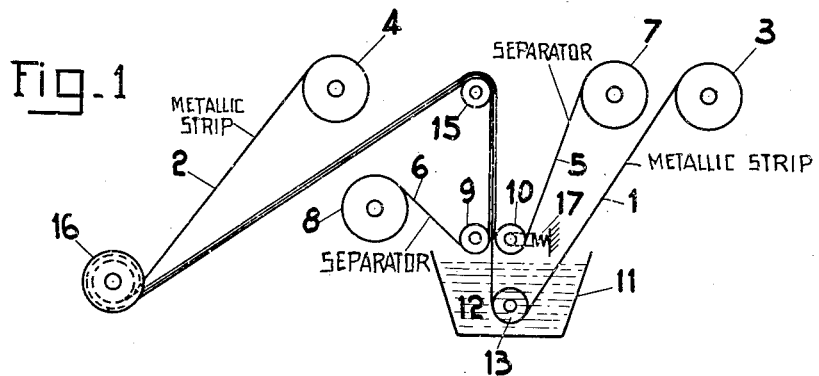
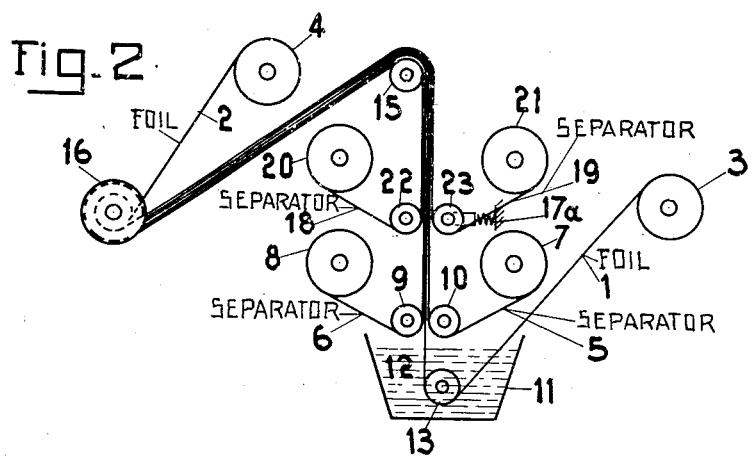
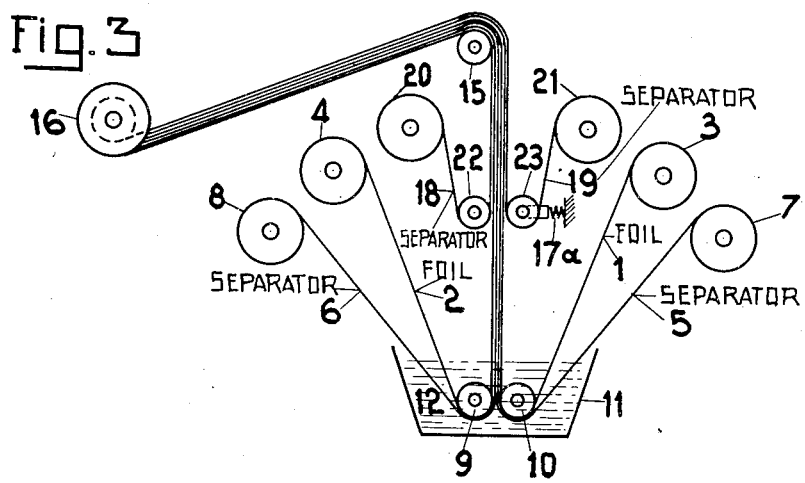
INVENTOR
DONALD E. GRAY
BY
Edwards, Bower & Pool
ATTORNEYS Patented Dec. 5, 1939

2,182,376

UNITED STATES PATENT OFFICE 2,182,376

ELECTROLYTIC CONDENSER AND METHOD OF MAKING THE SAME

Donald E. Gray, Yonkers, N. Y., assignor to Cornell-Dubilier Corporation, New York, N. Y., a corporation of New York Application July 6, 1934, Serial No. 733,976

13 Claims. (Cl. 175—315)

My invention relates to electrolytic condensers and a method and means for making such condensers, and more particularly to electrolytic capacitors comprising one or more metallic foils or plates coated with an oxide or dielectric film spaced from a second foil or plate by an electrolyte held by a carrier, such as a porous or other separator impregnated with an electrolyte solution.

The general object of my invention consists in the provision of a novel method for making electrolytic condensers which is simple and easy to carry out and does not require highly trained and technical experience, as in the case of hitherto known methods in the art of manufacturing electrolytic condensers, resulting in the provision of an efficient and economical condenser of comparatively small size and employing a minimum of material.

More specifically, one object of my invention is to provide a novel method for more rapidly and economically preparing and applying an electrolyte solution for electrolytic capacitors; and particularly to eliminate the necessity of boiling the electrolyte solution, resulting in a more uniform electrolyte and a more economical condenser due to decreased manufacturing cost.

Another object of my invention is to enable the use of very thin paper or other fibrous or non-fibrous separating material acting as a spacer and electrolyte carrier between the active foils or plates of an electrolytic condenser.

Another object of my invention is to materially decrease the size and bulk of an electrolytic condenser of given electrical characteristics in comparison with similar condensers known in the art.

A further object of my invention consists in making possible the use of a minimum thickness of the separating spacer or possibly of no spacing material at all between the active metal electrodes or foils of an electrolytic condenser.

A further object of my invention consists in a method and means for assembling electrolytic condensers making it possible to use a thin paper or similar material and acting as a separator and electrolyte carrier between the active metal electrodes and having little or no tensile strength, resulting in a decrease of material required and size, resulting in lower cost and price of the finished condenser.

Still a further object of my invention is to provide a new method and means for efficiently applying an electrolyte solution to the condenser foil or foils to secure a uniform layer thereon, in some instances without the necessity of a separator being arranged between adjacent foils.

A further object of my invention is to present a new method consisting in a uniform mechanical application of the electrolyte solution to the metallic film electrodes or metal plates and/or fibrous separators arranged between the active electrodes.

These and other objects and advantages of my invention will be apparent from the more detailed description and explanation thereof which follows. It is to be understood that the description is to be regarded as illustrative only of the general principle of the invention which is subject to various modifications and embodiments as will become obvious.

In the accompanying drawing, I have illustrated schematically an arrangement for efficiently and economically carrying out the application of the electrolyte solution to the condenser foils and/or separators, respectively. It should be understood, however, that the apparatus for carrying out my invention is subject matter of my copending divisional application Serial No. 259,601, filed March 3, 1939, and I do not claim herein such an apparatus.

In the accompanying drawing Fig. 1 illustrates schematically a method of carrying out the invention in a practical and economical manner. Figs. 2 and 3 show modifications.

I have shown at 1 and 2, two foils such as strips of aluminum continuously supplied from rolls 3 and 4. One or both of these foils may be coated with a dielectric or oxide film in accordance with well known methods, depending on whether the condenser is intended for use with D. C. only or combined A. C. and D. C. use, respectively. Separators 5 and 6 are supplied from rolls 7 and 8, respectively, such as strips of paper, gauze or other fibrous or non-fibrous material to be placed between the metal sheets serving as spacers and electrolyte carriers to insure sufficient electrical conductivity from one electrode to the other.

Foil 1 is passed through a tank or container 11 filled with electrolyte solution 12 of proper chemical and physical composition, as described hereinafter, by means of a guide roll 13 arranged in the tank as shown, in such a manner and at a proper rate so as to produce a thick and uniform coating of paste-like electrolyte thereon. The foil 1 is preferably the anodic or filmed foil in case of a condenser intended for D. C. operation, in which case foil 2 may consist of a strip of similar unformed metal.

After leaving the tank 11, the foil 1 is then passed through a pair of rollers 9 and 10 which furthermore serve for guiding and applying the spacer strips 5 and 6 at either side of the foil 1, as shown.

A device for applying mechanical pressure, such as an adjustable compression spring 17, is provided to press the rollers 9 and 10 closely together and against the foil 1 and separating strips 6 and 5 in such a manner as to secure a sufficient and intimate adherence of the electrolyte coating to the metal foil 1 and spacer strips 5 and 6 and to effect a penetration of the electrolyte into the pores or openings of the spacer strips. The foil 1 with the thus applied separating or spacer strips 5 and 6 on either side is then passed on as by means of a further guide roll 15 and then wound into a roll 16 together with the second foil 2 which may be an unformed foil of aluminum in case of a condenser for use in D. C. circuits or which may be a second foil with an anodic film formed thereon in case the condenser is intended for operation in A. C. circuits, as set forth.

The second foil 2, it is to be understood, may also be coated with the electrolyte in a similar manner to foil 1 or it may be a blank foil as may be desired. In the former case the foil 2 may be passed through a separate tank similar to the tank 11 filled with the electrolyte solution or it may be passed through the same tank as foil 1 in similar arrangement as will be apparent.

After a sufficient number of turns have thus been wound to form the roll 16, depending on the desired capacity of the condenser, the strips may be cut off and roll 16 further assembled and mounted in a metal can or paper container provided with terminal connections, in a manner well known in the art. The condenser roll 16 may then also furthermore be treated by passing an A. C. therethrough in order to finally complete the condenser and secure the most efficient electrical characteristics.

In the example shown in Fig. 1, a separating fibrous sheet is applied at each side of the conducting strip although it is to be understood that several sheets may be applied to either one or both sides of the conductor. Thus, it is possible to supply each of these sheets from a separate roll or to wind two or more sheets, such as thin paper strips, into a supply or roll and then unwind them simultaneously during the covering process of the metallic strip. Furthermore according to another feature of the invention, it is possible to supply different sheets from separate supplies in such a manner as to apply first sheets having a particular property to both sides of the metallic conducting strip and then apply at a separate place sheets of equal or different strength, equal or different porosity, and equal or different widths, etc.

A similar manifold application is also possible if several sheets are simultaneously supplied from a suitable supply prepared in advance, as illustrated in Fig. 2 wherein the separator sheets 5 and 6 are supplemented by additional separator sheets 18 and 19 supplied respectively from rolls 20 and 21 and passed over guide and pressure rolls numbered, respectively, 22 and 23 whereby the sheets 18 and 19 are applied to the outer faces of the respective separator sheets 6 and 5, thus providing in effect manifold separator sheets comprising a plurality of layers. In this arrangement it will be found sufficient to supply adjustable pressure at the rolls 22 and 23 only, as by an adjustable compression spring 17a; although if desired devices for applying pressure at the rolls 9 and 10 as indicated at 17, Fig. 1, may also be employed. It is to be understood, however, that if a sufficiently thin solution of electrolyte were employed it would be unnecessary to pass the foil and separator strips through a set of pressing rolls for the amount of solution carried up by the foil from the solution container or tank would be in such case so small in quantity that there would be no excess to squeeze off. The advantage of such manifold sheets is obvious. Thus the inner sheets may, for instance, be highly porous, consisting of a very thin absorbent silk paper while the next layer may be more dense and of greater strength whereby its porosity and thickness may be equal, less, or greater than that of the innermost layer. Then a third layer may, for instance, be applied serving as a cover. In this case it is preferable to apply such covering layer only at one side of the conductor to serve as a third outer layer during the manufacture.

It is further to be understood that for the manufacture and further treatment of the condenser elements or of the finished condenser units, any known method may be used especially as regards the provision of connecting leads or terminal tabs mounting of the condenser in a metallic or cardboard container, and sealing or molding of the condenser unit by any suitable process, and means as known in the art.

It is furthermore to be understood in accordance with a further feature of the invention that according to the same principle as disclosed, a stock of treated and assembled condenser strips may be provided comprising two or more metallic conductors in such a manner that all that is necessary for completing the finished condenser consists in winding a definite length of such strip to a roll and treating and mounting it to obtain a completed condenser. In this case the other strips may be passed through the same bath or through another impregnating bath and may be covered with separating sheets at either one or both sides. Then the thus prepared conductors are passed over suitable guide rolls and placed upon each other in such a manner that either a separating sheet is placed upon another separating sheet or in the case that one of the conductors has only one side covered with a separating sheet that the uncovered side of one conductor is placed in contact with the separating sheet of the other conductor. The thus combined conductors and separating sheets are then wound into a roll serving as a supply or stock to be used for immediate or later assembly and construction of individual condenser units. In the thus obtained composite strips comprised of conductors and separating sheets either all of the conductors may be preformed, or, if desired, only one conductor may be preformed or the forming process may be carried out after assembly into the condenser unit. In general all the methods of treating and assembly may be applied to this type of composite condenser strip as has been described hereinbefore in detail in connection with a single treated and covered metallic foil.

The porous separating sheets may consist of fibrous material as stated hereinbefore such as of very thin cloth, gauze, or of silk paper. The use of paper naturally considerably decreases the manufacturing cost. If paper is used care should be taken when selecting the electrolyte or impregnating means that it contains no solvent of the paper or constituents contained therein.

Thus in general the presence of sulphuric acid in the electrolyte is to be avoided.

The guide and pressure rollers serving for pressing the electrolyte into the absorbent separator have preferably a comparatively large diameter in order to prevent the tearing of the paper and in order to distribute the pressure over a large surface. It is suitable to choose a diameter of the rollers of the order of about 100 to 200 mm.

The container 11 may be of very small size so that the manufacturing equipment requires only a small space. Also the further advantages obtained in that the impregnating means may be continuously kept in a fresh state since the small container may be constantly replenished, thus preventing the impregnating material or electrolyte from becoming stale or otherwise deteriorated.

The electrolyte which may be used in the process is the subject of my co-pending application Serial No. 259,850 filed March 4, 1939, now Patent No. 2,162,397, and may consist of a mixture of (1) an anhydride or oxide of a weak acid, the anhydride being an oxide which combines with water to produce an acid, as is well known; (2) an alkali metal hydroxide or ammonium hydroxide or an alkali metal oxide or ammonia, respectively; and (3) a polyhydroxyl alcohol. The anhydride or oxide of a weak acid of group (1) may be boric oxide ($B_2O_3$). I have found that for group (2) the following oxides or hydroxides, respectively, give good results: sodium hydroxide or sodium oxide; ammonium hydroxide or ammonia; potassium hydroxide or potassium oxide; calcium hydroxide or calcium oxide; strontium hydroxide or strontium oxide; lithium hydroxide or lithium oxide. For the polyhydroxyl alcohol of group (3) glycerin or ethylene glycol may be used.

As an example, a simple method which I have found to give satisfactory and good results consists in mixing the polyhydroxyl alcohol, such as ethylene glycol or glycerin (group 3) with ammonia or an alkali oxide (group 2), thus making an alkaline glycerin or alkaline glycol solution, both of which give satisfactory results. Then to this mixture is added the desired quantity of the weak acid oxide, such as boric oxide (group 1), as mentioned above. The whole is thus thoroughly stirred to produce a certain desired, sticky, gummy and paste-like mass of thick consistency and structure to make the electrolyte. The boric oxide is obtainable in a powdered state, and when mixing with the ammoniated glycerin, or equivalent, as noted above, it is stirred, whereby a slight amount of heat is generated due to the chemical reaction and composition of the compounds. In making this solution, no external heat is necessary to be applied as the solution is ready as soon as the mixing is complete, or, if it is desired to quicken the chemical action, a slight amount of heat can be applied.

While it is preferred to add the alkali of the electrolyte to the polyhydroxyl alcohol, this is not required as good results can be obtained by mixing the oxide of a weak acid (group 1) with the polyhydroxyl alcohol (group 3), and then adding the alkali metal oxide or ammonia gas (group 2); or the alkali metal oxide or ammonia (group 2) may be added to the oxide of a weak acid (group 1) and the polyhydroxyl alcohol (group 3) then mixed.

The electrolyte can also satisfactorily be made by using nitrogenated polyhydroxyl alcohol such as triethanolamine or diethanolamine, in which case it is unnecessary to use the alkali of group (2), for nitrogenated polyhydroxyl alcohol has the alkaline reaction in itself. This electrolyte, therefore, may be made with the nitrogenated polyhydroxyl alcohol and the oxide of a weak acid only.

I have also found it desirable in some cases to add a suitable thinning medium, such as water or a monohydroxyl alcohol to the above solution of electrolyte. Or it is also possible to replace a portion of the said weak acid oxide or alkali with the salt of a weak acid or a weak acid itself.

I have also found it desirable, but not entirely necessary, to add to the thus prepared electrolyte solution, various types of gum, such as gum tragacanth in order to produce certain desired characteristics in the electrolytic capacitor in which the electrolyte solution is used. The gum should be added to the solution at a temperature not above 70° C. and should be sifted into the solution slowly and mixed thoroughly as each small quantity is added. Instead of gum tragacanth, other fillers can be used such as kaolin, casein, starches or sugars and possibly commercial plastics, as this merely acts as a filler to make the solution thicker without having a deteriorating chemical effect on the electrolyte.

The thus produced electrolyte is then applied to the condenser winding. When gum is added to the electrolyte in order to get the electrolyte to the desired state of hardness or desired state of consistency, I preferably subject the finished condenser winding, having the electrolyte applied to it, to an internal heat treatment by passing an electric current through the condenser or by any other suitable means in order to produce certain chemical or physical changes or both as may be desired, such as to obtain a substantially hard and dry condenser unit or to cause reaction between the excess moisture and the compound with the gum or to produce the desired consistency to secure certain electrical characteristics in the capacity unit. To obtain these results the temperature of the wound capacitor may be raised to about 107° C. However, good results may also be obtained with lower temperatures, such as 90° or less, applied for slightly longer periods of time, or in the alternative higher temperatures may be applied for shorter times. The current for the heat treating of the capacitor section would be A. C. for A. C. operating units; or D. C. with superimposed A. C. for uni-directional current operating units. If the condenser section be heated on the A. C. a smaller section would be heated on a higher frequency than a larger section, thus causing a larger amount of heat through greater losses within the condenser section. In this way it is possible to heat treat an 8 mfd. D. C. condenser by superimposed A. C. current of possibly 500 to 1000 cycles. If 60 cycles A. C. current were used to heat the 8 mfd. section, the loss in the condenser would not be sufficient to raise the temperature of the section high enough to cause the necessary chemical and physical changes desired in the solution. If desired the heat treating of the condensers may be applied in an oven where heat is supplied either by steam, gas or other suitable means.

The condensers may be finished in any desired manner; they may be baked or dried or electrically re-treated and the electrolyte may be hardened or dried in any desired manner. The condenser element may furthermore be embedded in a wax or with another embedding material. It may be enclosed in a metal container or may be assembled and finished in any other desired manner.

The advantages of the invention have been set forth in the description hereinbefore presented. It is especially to be noted that the described mechanical application of the impregnating material, especially of the electrolyte insures a uniform application and uniform coating of the electrodes as well as an even impregnation of the separating sheets. It makes it possible to use a cold impregnating material, even if the latter is comparatively thick or viscous at room temperature. The impregnating material is used in a most economic manner since there is practically no waste to it. In view of this efficient and uniform process large capacities may be produced with a minimum of expenditure of material, thus decreasing manufacturing cost also in this respect and increasing the field of application in view of the decreased space required. The separating sheet may preferably consist of a layer of thin and very fine paper since the latter is scarcely subjected to any mechanical stress.

Various other changes may be made without departing from the spirit and scope of the invention. For instance, while Figs. 1 and 2 show the metallic sheets or foil strips alone arranged to pass through the electrolytic solution, it is to be understood that alternatively in accordance with the spirit of the invention part or all of the fibrous or paper strips for the condenser may be impregnated in a similar manner, as appears from Fig. 3, which illustrates both metallic sheets 1 and 2 and a pair 5 and 6 of the paper strips, in a composite strip arrangement of the general type described as passing through the impregnating solution.

I claim:

1. The method of manufacturing electrolytic capacitors which comprises passing a metal foil through a solution of electrolyte of comparatively thick consistency at such rate as to produce a thick and uniform coating of electrolyte on said foil, applying an uncoated fibrous spacer to said coated foil, applying controlled pressure thereto to impregnate the spacer with said coating and to remove excess electrolyte therefrom, and thereafter winding the combined foil and spacer with associate capacitor elements into a supply roll from which the wound material may be withdrawn in units for the individual capacitors as desired.

2. The method of manufacturing electrolytic capacitors which comprises passing a metal foil through a solution of electrolyte of comparatively thick consistency to produce a comparatively thick coating of electrolyte on said foil, winding the coated strip into a roll with associate elements of the capacitor and subjecting the capacitor section to internal heat supplied by an alternating current of higher frequency than that for which the capacitor is intended to be used.

3. The method of manufacturing electrolytic capacitors which comprises passing a metal foil through a solution of electrolyte, applying a dry spacer strip to each side of said foil as it comes out of said solution, and then subjecting the coated foil and said strips to pressure at opposite sides so as to insure suitable adherence of the electrolyte thereto and to effect a penetration of the electrolyte into the pores or openings of the spacer strips.

4. The method of manufacturing electrolytic capacitors which comprises passing a metal foil through an electrolyte to produce a coating of the electrolyte on said foil, then applying uncoated spacer strips to opposite sides of said coated foil after the latter emerges from said electrolyte, and applying pressure to insure suitable adherence of the coating to the foil and strips, and to effect a penetration of the solution into the openings of said strips, and then winding the assembled foil and strips into a supply roll from which the assembled material may be withdrawn for the assembly of individual capacitors.

5. The method of manufacturing electrolytic capacitors which comprises passing a metal foil through a solution of electrolyte at such a rate as to produce a fairly thick covering of electrolyte on opposite sides of the foil, then guiding the coated foil between pressure rollers with uncoated spacer strips interposed between the rollers and the foil at opposite sides of the latter whereby an adherence of the electrolyte coating to the foil is promoted and the interstices of the spacer strips are penetrated by the electrolyte, and thereafter placing the second foil at the side of one of said spacer strips which is not adjacent the first mentioned foil and winding the composite foils and spacer strips into a supply roll.

6. The method of manufacturing electrolytic capacitors which comprises continuously passing a metal foil strip through an electrolyte of fairly thick consistency at a rate to produce a fairly thick and uniform coating of electrolyte on both sides of said foil and applying a separator strip to at least one side of the coated foil strip while at the same time removing excess electrolyte from the coated foil and spacer.

7. The method of making an electrolytic capacitor which comprises applying a thick coating of viscous electrolyte to a metallic condenser strip, said strip having sufficient strength to support said coating, applying a relatively weak and uncoated separator strip to said coated strip, and then passing said strips together between rolls under controlled pressure, thereby coating the weak strip with said electrolyte.

8. The method of manufacturing electrolytic capacitors which comprises passing a metallic condenser strip through a solution of electrolyte of comparatively thick consistency at such rate as to produce a thick and uniform coating of electrolyte on said strip, and thereafter applying an uncoated separator strip and controlled pressure to the coated strip to insure adherence of the electrolyte coating to both strips and to remove the excess.

9. The method of treating an electrolytic capacitor containing metallic elements separated by spacers impregnated with paste electrolyte, which comprises subjecting the capacitor to internal heat by the application to the metallic elements of an alternating voltage of higher frequency than that for which the capacitor is intended to be used.

10. The methof of treating an electrolytic capacitor containing metallic elements separated by spacers impregnated with paste electrolyte, which comprises subjecting the capacitor to heat by applying to the metallic elements a direct current voltage with superimposed alternating current when the capacitor is to be used for unidirectional current operation.

11. The method of treating an electrolytic capacitor containing metallic elements separated by separators impregnated with a paste electrolyte made by mixing (1) a substance from the group composed of anhydrides and oxides of a weak acid, (2) a substance from the group composed of alkali metal hydroxides, ammonium hydroxide, ammonia, and alkali metal oxides, (3) a polyhydroxyl alcohol, (4) a gummy material such as gum tragacanth, and some free water, which comprises subjecting the capacitor to an internal heat treatment by applying to the metallic elements an electric current which raises the temperature of the capacitor to about 90° C.

12. The method of manufacturing electrolytic condensers which comprises passing a metal foil electrode through a solution of electrolyte of comparatively thick consistency at such rate as to produce a thick and uniform coating of electrolyte on said foil, applying an uncoated fibrous spacer to said coated foil and thereafter winding the coated foil and spacer into a roll with an associated electrode foil and spacer of the condenser.

13. The method of manufacturing electrolytic capacitors which comprises passing a metal foil through a solution of electrolyte of comparatively thick consistency at such rate as to produce a thick and uniform coating of electrolyte on said foil, applying an uncoated permeable spacer to said coated foil, and thereafter assembling a capacitor element comprising said coated foil and spacer.

DONALD E. GRAY.